April 7, 1953 J. MacGREGOR 2,633,613
WEATHERSTRIP FOR HATCH COVERS
Filed July 14, 1949
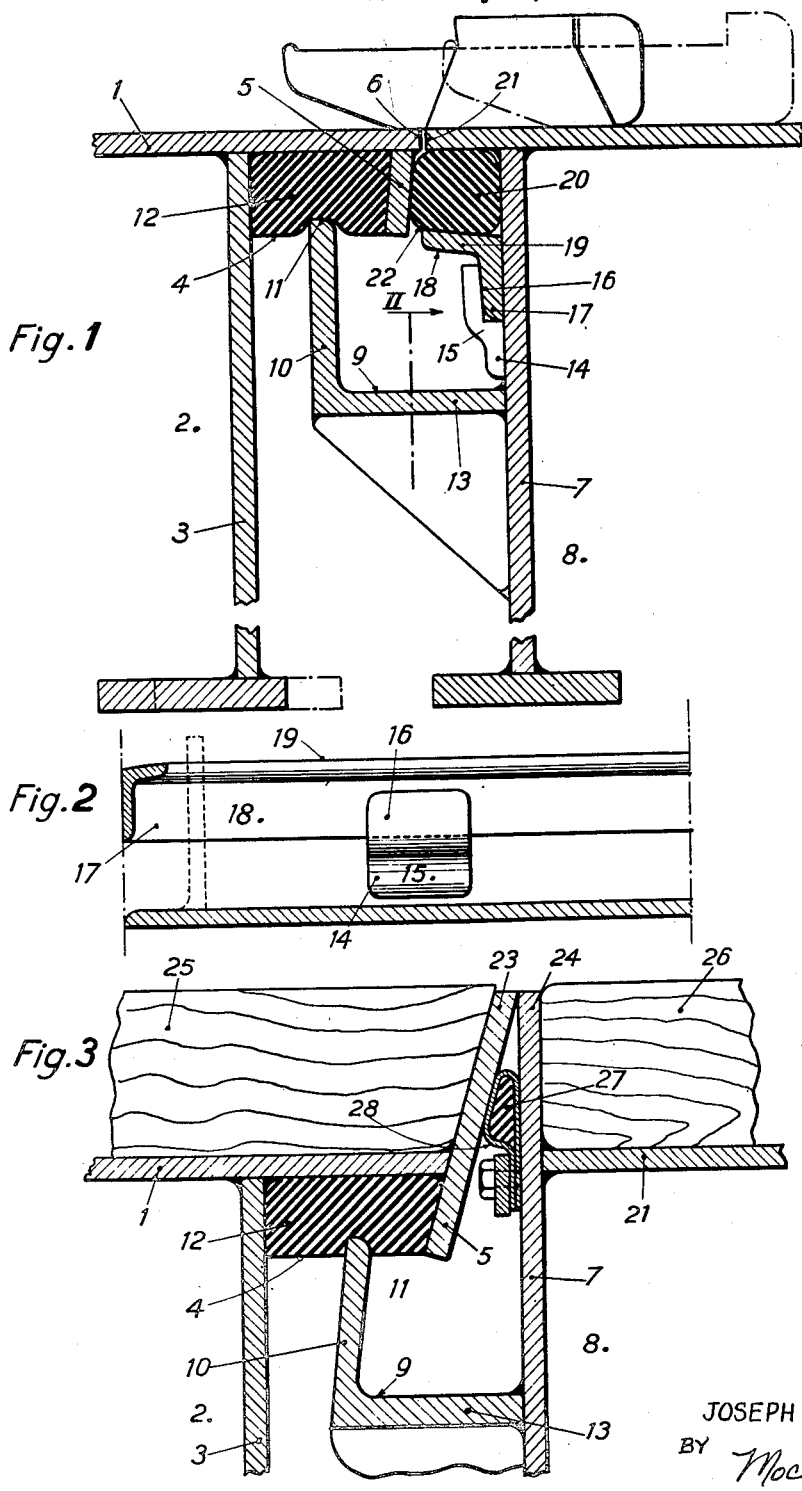
INVENTOR.
JOSEPH MACGREGOR
BY Mock & Blum
ATTORNEYS Patented Apr. 7, 1953

2,633,613

UNITED STATES PATENT OFFICE 2,633,613

WEATHERSTRIP FOR HATCH COVERS

Joseph MacGregor, Whitley Bay, England

Application July 14, 1949, Serial No. 104,713
In Great Britain August 17, 1948

5 Claims. (Cl. 20—69)

This invention relates to steel covers for ships' hatches and has for its object the provision of an efficient fluid-tight joint between two relatively movable parts of a hatch covering. The invention is especially, though not exclusively applicable to a cross joint between two adjacent sections of a sectional hatch cover, in which case the two cover sections constitute the relatively movable parts.

Broadly the invention provides a fluidtight joint for a ship's hatch covering which comprises two masses of resilient packing material, one of which masses is housed in a channel formed on one of two relatively movable parts of the hatch covering, the act of closing the hatch cover resulting in both masses of packing material being compressed by reason of the contact therewith of rigid surfaces provided on the two relatively movable parts of the hatch covering.

In preferred arrangements one mass of packing material is carried in a channel on one part, e. g. one section of a hatch cover, and when the hatch cover is closed, rests upon a rigid surface of an associated part of the hatch cover, i. e. another cover section, an inclined surface on said first-mentioned part or section contacting with, so as to compress, another mass of packing material carried on said second-mentioned hatch section. The second mass of packing material may also be housed in a channel, in which case the two channel mouths open in directions substantially at right angles one to the other.

In applying the invention to a cross-joint between adjacent sections of a sectional hatch cover, there may be provided an upstanding coping element spaced away from the transverse end wall of one cover section, an inverted channel associated with the opposing transverse end of an adjacent cover section and housing resilient packing material which is adapted to be compressed, when the adjacently disposed sections are in the hatch-closing position, by reason of the top of the aforesaid coping becoming embedded in the packing material in said inverted channel, and a second channel above the coping and mounted on the wall of the section associated with said coping, said second channel opening toward the opposing transverse wall of the adjacent cover section and housing resilient packing material which is adapted to be compressed by the contact therewith of the inclined face of a part associated with the opposing cover wall when the adjacently disposed cover sections are in the closed position.

The invention is illustrated by the accompanying drawings wherein:

Figure 1 is a transverse section through a cross-joint between adjacent sections of a sectional hatch cover, both masses of resilient packing material being housed in channels, Figure 2 is an end view looking in the direction of arrow II, Figure 1, and Figure 3 is a view similar to Figure 1 showing a modified cross-joint in which only one mass of packing material is housed in a channel.

In the embodiment illustrated in Figures 1 and 2, the top plate 1 of a cover section 2, which is one of two adjacently disposed cover sections, overhangs the transverse wall 3 at that end of the cover section and constitutes the "floor" of an inverted channel 4, the opposite side flanges of this inverted channel 4 being formed by the transverse, usually vertical, end wall 3 of the cover section 2, and a bar 5 depending from near the edge 6 of the overhanging portion of the top plate 1 of the cover section 2. This flange-forming bar 5 is inclined downwards and inwards toward the transverse end wall 3 of the cover section 2. To the transverse wall 7 of the adjacent cover section 8 an angle-sectioned bar 9 is welded so that one flange 10 thereof upstands to form a coping, the top edge 11 of which is adapted to bed into a thick strip or pad 12 of sponge rubber or the like housed in the inverted channel 4. Above that flange 13 of the angle bar 9 by which it is welded to the end wall 7 of the second-mentioned cover section 8 are welded or otherwise secured the lower halves or margins 14 of a number of spaced-apart metal cleats 15, the upper halves or margins 16 of said cleats 15 being spaced away from the associated cover end wall 7 to provide a number of openside pockets. Within these pockets is detachably received one flange 17 of an obtuse angled bar 18, the other flange 19 of this bar 18 extending out to form an upwardly inclined shelf. Where, as will usually be the case, more than one bar 18 is used to cover the width of the cover section 8, the butting ends of two such bars 18 are arranged to lie within a cleat 15. The shelf-forming flange 19 of the obtuse angled bar 18 forms one side of a second packing-holding channel 20. The opposite side of this second channel 20 is formed by the overhanging end of the top plate 21 of the cover section 8 on which the coping-forming angle bar 9 is secured and the obtuse-angled bar 18 is mounted. The "floor" of the second channel 20 is constituted by part of the transverse end wall 7 of the cover section 8. Within the second channel 20 is adapted to be accommodated a strip 22 of sponge rubber or the like which is conveniently circular in cross section. When the two adjacently disposed cover sections 2, 8 are in their hatch-closing positions, as shown in Figure 1, the inclined wall 5 of the inverted channel 4 provided on the cover section 2 contacts with, so as to compress, the packing material 22 which projects out of the mouth of the channel 20 provided on the adjacent cover section 8. It will be seen that the second channel 20 which faces outwards toward the side 5 of the first, that is, the inverted channel 4, has its mouth opening in a direction substantially at right angles to the mouth of said inverted channel 4.

The angle bar 9 which by its flange 10 provides the upstanding coping serves as a drain to carry off, through drain holes provided in the longitudinal sides of the cover sections 2, 8, any water which enters between the two adjacent sections before they are clamped down on the hatch coaming.

The projecting face of the packing material 22 in the second channel 20 can be advanced by the insertion behind the packing of removable rubber or wooden packing strips (not shown) so as to ensure intimate fluidtight contact between the packing 22 and the opposing side 5 of the first or inverted channel 4 and thus preventing any flooding of the drain-forming channel formed by the angle bar 9.

The form of cross joint illustrated in Figure 1 is shown as applied to a sectional hatch cover intended for supporting a cover on a deck coaming. The invention is, however, applicable also to flush deck covers and its application thereof is illustrated by Figure 3 which shows also a modified arrangement of mounting packing equivalent to the packing 22 of Figure 1. The form of a cross-joint shown in Figure 3 is similar to that in Figure 1 in so far as it concerns the mounting of packing 12 in the inverted channel 4 and the co-operation therewith of the coping flange 10 of angle 9 and similar parts have been given the same reference numbers as employed in Figure 1. In Figure 3 the inclined wall 5 of channel 4 is extended upwards as indicated by reference 23, to meet the end wall 7 of cover section 8 which end wall 7 is not overhung by the top plate 21 of said cover section 8, but extends as indicated by reference 24 above the level of said top plate 21. The extensions 23 and 24 serve as end stops or abutments for planks 25, 26 forming respectively part of the top of the flush hatch cover and part of the neighbouring deck. The equivalent of packing 22 of Figure 1 is provided in the form of a circular section length of sponge rubber 27 or the like wrapped in tape 28 which is clamped to the wall 7 by means of a flat metal bar 29.

Cover sections having a cross joint of the character above described may be furnished with eccentrically-bushed wheels on which the sections may be rolled to an end of the hatchway for stowing purposes and by varying the setting of these wheels the auxiliary packing in the second channel may make a joint which is sufficiently raintight when covers are rolled together horizontally without having to adjust the wheels to bring the main packing, in the inverted channel, into operation except when the ship fitted is actually at sea with hatches tightly battened down.

What I claim is:

1. A ship's hatch cover arrangement including two removable hatch cover closure members adapted to be positioned in adjacent relation with edge areas of the members positioned on opposite sides of a division line between the members, said members each having a dependent element extending normal to the top and bottom surfaces of the members at least one of said members having its dependent element secured to the under face of such member and remote from the division line between said closure members to thereby provide a space of extended width between the dependent elements below the closure members, an angular member of approximately right angular cross-section carried by one of the depending elements and secured thereto intermediate the ends of a cross-section of the element and spaced from the closure members, said angular member having a substantially horizontally-extending lower wall of extended width and edge-secured to the depending element and a substantially vertically upstanding wall integral with said lower wall, said walls with the depending element forming an open-top channel, the width of the lower wall being less than the width of the space between the depending elements but sufficient to completely underlie the division line between the closure members and to extend materially beyond such line away from the depending element to which it is secured, the second closure member having a downwardly extending element adjacent the division line to thereby divide the top space above said substantially vertical wall into two individual spaces, the space underlying the division line having a resilient mass for forming a closure below the division line, said mass being supported by means carried within the channel by the first depending element, the other space also having a resilient mass filling this other space and overlying the top of the substantially vertical wall of the channel angular member in contacting said substantially vertical wall, the securing positions of the lower wall of the angular member and of the first mass supporting means being such as to place both resilient masses under compression stress when the closure members are in hatch closing position.

2. A hatch cover arrangement as in claim 1 characterized in that the depending elements of both closure members are each secured to the under faces of the respective closure members remote from the division line of the members with the intermediate downwardly extending element secured to the under face of the second closure member adjacent to but spaced from the division line edge of such member to thereby place the top of the resilient mass of the first top space as extending on opposite sides of the division line, the second mass underlying and contacting the under face of the second closure member and extending the full width of the top space between the depending element and the downwardly extending element of said second closure member with the substantially vertical wall of the channel angular member contacting with and applying pressure to the under side of said second mass when the arrangement is in service position.

3. A hatch cover arrangement as in claim 2 characterized in that the upper face of the first mass supporting means extends in a plane inclined upwardly to a horizontal plane leading away from the depending element of the first closure member with the inner edge of the face spaced from the downwardly extending element of the second closure member, said downwardly extending element being inclined in a downward direction from the second closure member with the direction relative to a vertical plane and away from the depending element of the first closure member, the lower edge of the inclined element being more remote from such depending element than its upper secured edge to thereby apply compression stresses of varied values to the first resilient mass with the major stresses active at the top face of the mass and the mass face on the inner side of the mass in contact with the downwardly extending element, the space between the lower edge area of the latter element and the first mass supporting means permitting the passage of leakage from the first mass to the channel element, the under face of the second resilient mass between such downwardly extending element and the upstanding substantially vertical wall of the channel preventing leakage from the channel over said wall and downward through the hatch into the hold.

4. A hatch cover arrangement as in claim 1 characterized in that the lower areas of the closure members are metallic with the upper areas of such members being non-metallic to render said members of composite type and of extended thickness, the first member depending element being positioned in overlying relation and secured to the division line end of such member, the depending element of the second closure member being secured to the under face of such second closure member remote from the division line of such members, said depending elements thereby producing the space of extended width therebetween and in which the angular element is secured to the first member depending element to form therewith the open top channel, the intermediate downwardly extending element being of extended width vertically and being positioned in overlying relation and secured to the edge of the second closure member confronting the edge of the first closure member in the vicinity of the division line between the closure members and extending downward below the horizontal plane which includes the top of the substantially vertically extending wall of the channel angular element, the confronting upper edges of the first member depending element and of the intermediate downwardly extending element being positioned in contact relation to provide the top division line between the closure members with the latter element dividing the top space into two individual spaces above the channel top plane, a mass of resilient material for and individual to each of the top spaces and active respectively in the control of fluid movement from the division line into the channel and the escape of fluid from the channel over the substantially vertical wall of the latter and into the hold.

5. A hatch cover arrangement as in claim 4 characterized in that the intermediate downwardly extending element of the second closure member has its width cross-section extending downward from the division line with the direction inclined to the vertical with its lower edge spaced remotely from the first closure member depending element to thereby present the first top space as of increasing width downwardly, said first resilient mass having means for securing it to the first member depending element within said width-increasing space with the mass located intermediate and spaced from both edges of the cross sectional width of the intermediate downwardly extending element and above the top plane of the metallic area of the closure members when the closure members are in their service positions, said mass being of material vertical height and having a cross-section contour complemental to the opposing walls of the space to thereby provide a control means for fluid movement from the division line to the channel, the other top space having its resilient mass underlying and contacting the under surface of the second closure member between the second closure member depending element and the intermediate downwardly extending element, the substantially vertical wall of the channel having its top edge engaging and applying upward pressure to an intermediate position of the bottom of the mass on a cross section of the width of the latter to thereby control fluid movement from the channel over the top of the substantially vertical wall of the latter and into the hold.

JOSEPH MacGREGOR.

REFERENCES CITED

The following references are of record in the file of this patent:

UNITED STATES PATENTS

| Number | Name | Date |
| --- | --- | --- |
| 807,681 | Lunken | Dec. 19, 1905 |
| 866,439 | De Canio | Sept. 17, 1907 |
| 2,236,315 | Gray | Mar. 25, 1941 |
| 2,275,128 | Campbell | Mar. 3, 1942 |
| 2,421,400 | Young | June 3, 1947 |
| 2,528,264 | Coppock et al. | Oct. 31, 1950 |

FOREIGN PATENTS

| Number | Country | Date |
| --- | --- | --- |
| 472,670 | Great Britain | Sept. 28, 1937 |
| 818,148 | France | Sept. 18, 1937 |